United States Patent
Shankar et al.

(10) Patent No.: US 8,914,632 B1
(45) Date of Patent: Dec. 16, 2014

(54) USE OF ACCESS CONTROL LISTS IN THE AUTOMATED MANAGEMENT OF ENCRYPTION KEYS

(75) Inventors: Umesh Shankar, New York, NY (US); Kenton Varda, Palo Alto, CA (US); Darrell Kindred, Columbia, MD (US)

(73) Assignee: Google Inc., Mountain View, CA (US)

( * ) Notice: Subject to any disclaimer, the term of this patent is extended or adjusted under 35 U.S.C. 154(b) by 157 days.

(21) Appl. No.: 13/398,590

(22) Filed: Feb. 16, 2012

Related U.S. Application Data

(60) Provisional application No. 61/578,377, filed on Dec. 21, 2011.

(51) Int. Cl.
*H04L 29/06* (2006.01)
*G06F 21/24* (2006.01)
*G06F 21/62* (2013.01)

(52) U.S. Cl.
CPC .......... *H04L 63/101* (2013.01); *G06F 21/6209* (2013.01)
USPC ............................................ 713/167; 726/27

(58) Field of Classification Search
None
See application file for complete search history.

(56) References Cited

U.S. PATENT DOCUMENTS 8,176,283 B1 * 5/2012 Hanson et al. ................ 711/163
8,601,263 B1 * 12/2013 Shankar et al. ............... 713/166

* cited by examiner

*Primary Examiner* — Gilberto Barron, Jr.
*Assistant Examiner* — Devin Almeida
(74) *Attorney, Agent, or Firm* — Fox Rothschild LLP

(57) ABSTRACT

Methods and systems for managing access to stored data resources assign one or more wrapped (encrypted) encryption keys to each data resource. The resources are encrypted, and the keys may be stored in an access control list (ACL) in association with the encrypted data resources. The keys may be wrapped with metadata that indicates who or what is authorized to use the resource and what role the user or users may have with respect to the resource. The keys may be unwrapped upon receipt of access requests from authorized users, and may be used to decrypt the data resources.

21 Claims, 3 Drawing Sheets

USE OF ACCESS CONTROL LISTS IN THE AUTOMATED MANAGEMENT OF ENCRYPTION KEYS

RELATED APPLICATIONS AND CLAIM OF PRIORITY

This application claims priority to U.S. provisional patent application No. 61/578,377, filed Dec. 21, 2011, the disclosure of which is incorporated herein by reference in its entirety.

BACKGROUND

Hosted storage services, such as cloud-based storage services, store data on a server which is located at a facility that is remote from the locations where the data is generated or used. The remote servers are typically hosted by a third party, who allows the data's owner and authorized users to access the data over a communications network such as the Internet.

Encryption is the process of converting data from an unencrypted format to an encrypted format. The unencrypted format is readable and unsecured. The encrypted format, sometimes called ciphertext, is unreadable except to those who can decrypt the data using, for example, an encryption key.

The process of obtaining and using encryption keys can be cumbersome to the end user. This document describes methods and systems that are directed to addressing some of the problems described above, and/or other problems.

SUMMARY

In an embodiment, a management server of a hosted storage service receives a data resource and a resource authentication credential. The hosted storage service may assign an encryption key to the data resource, encrypting the data resource to form an encrypted data resource, storing the encrypted data resource in a storage facility of the hosted storage service, and producing a wrapped encryption key based on the assigned encryption key. The service may store the wrapped encryption key in an access control list (ACL) in association with the encrypted data resource. When the service receives a first user's request to access the data resource, the service automatically and without additional input from the user, verifies that a presented authentication credential from the first user demonstrates authorization to unwrap the wrapped encryption key. If so, the service may unwrap the wrapped encryption key, use the unwrapped encryption key to decrypt the encrypted data resource, and provide the first user with access to the data resource.

In various embodiments, when assigning the encryption key to the data resource, the service may identify a key pouch for the data resource. If so, storing the wrapped encryption key in the ACL may include storing the wrapped encryption key in the key pouch. In some embodiments, the first user may request to share the data resource with a second user. If so, the service may confirm that the first user is authorized to share the data resource, re-wrap the wrapped encryption key for the second user, and store the wrapped encryption key in the key pouch.

In various embodiments, producing a wrapped encryption key may include identifying a role for the data resource, and generating a wrapped role-specific encryption key. Storing the wrapped encryption key in the ACL may include storing the role-specific encrypted key in the key pouch. The role-specific encryption key may include metadata that represents the scope of an access privilege for an authorized user of the role-specific encryption key. In various embodiments, receiving the request to access the data resource may include receiving a use request. If so, the service may determine whether the use request matches a role for the data resource, and retrieving the wrapped encryption key may include retrieving the wrapped role-specific encryption key having a role that matches the use request. The role may include, for example, an access privilege for an authorized user of the wrapped role-specific encryption key.

In various embodiments, when assigning the wrapped encryption key to the data resource, the service may identify one or more users or groups who are authorized to use a cleartext key, include the identified users or groups in metadata, and use the metadata to create the wrapped encryption key. The service also may identify one or more roles for the cleartext key and include the one or more roles in the metadata.

In an alternate embodiment, a management server of a hosted storage service may receive a data resource. The service may assign an encryption key to the data resource, create a wrapped encryption key comprising the assigned encryption key and authorized user metadata, encrypt the data resource to form an encrypted data resource, store the encrypted data resource in a storage facility, and store the wrapped encryption key in an ACL in association with the encrypted data resource. When a first user submits a request to access the data resource, the service may use a presented authentication credential to determine that the first user is authorized to use the wrapped encryption key. Automatically and without additional input from the user, the service may verify that the presented authentication credential demonstrates authorization to unwrap the wrapped encryption key. The service may then unwrap the wrapped encryption key, use the unwrapped encryption key to decrypt the encrypted data resource, and provide the first user with access to the data resource.

In an alternate embodiment, a data management system may include a hosted storage service that includes an authentication server, one or more datastores, an ACL memory, and a memory containing programming instructions that instruct the processor to perform any or all of the methods described above. For example, the instructions may enable the system to receive a data resource and a resource authentication credential, assign an encryption key to the data resource, encrypt the data resource to form an encrypted data resource, store the encrypted data resource in the datastore, create an ACL entry in the ACL memory, generate a wrapped encryption key, store the wrapped encryption key in the ACL entry in association with the encrypted data resource, receive a first user's request to access the data resource, verify that the first user's presented authentication credential demonstrates authorization to unwrap the wrapped encryption key, use the unwrapped encryption key to decrypt the encrypted data resource, and present the data resource to the first user.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

For the purposes of this document, an "electronic device" refers to a device that includes a processor and tangible, computer-readable memory. The memory may contain programming instructions that, when executed by the processor, cause the device to perform one or more operations according to the programming instructions. Examples of electronic devices include personal computers, gaming systems, televisions, and portable electronic devices such as smartphones, personal digital assistants, cameras, tablet computers, laptop computers, media players and the like.

An "authentication server device" refers to a computing device that is configured to determine whether a client device complies with an administrative policy. An authentication server device may include, without limitation, a server, a mainframe computer, a networked computer, a processor-based device, a virtual machine and/or the like.

A "client device" refers to an electronic device that is configured to access one or more administered resources over a network. A client device may be a portable or stationary electronic device. A "client application" refers to an application program configured to instruct a client device to perform one or more tasks.

A "hosted storage service" refers to one or more devices that store data at a facility that is remote from the locations of a client device. The data may include application data, data files, programming instructions, and/or other data. A "datastore" is a tangible, computer-readable memory device, or a group of such devices, within a hosted storage service.

A "management server device" refers to a computing device that is configured to apply an administrative policy to a client device. A management server device may include, without limitation, a server, a mainframe computer, a networked computer, a processor-based device, a virtual machine and/or the like.

A "wrapped key" refers to an encryption key that is itself encrypted using any suitable encryption technique, such as encryption with a key that is derived from a user's password.

Figure 1:
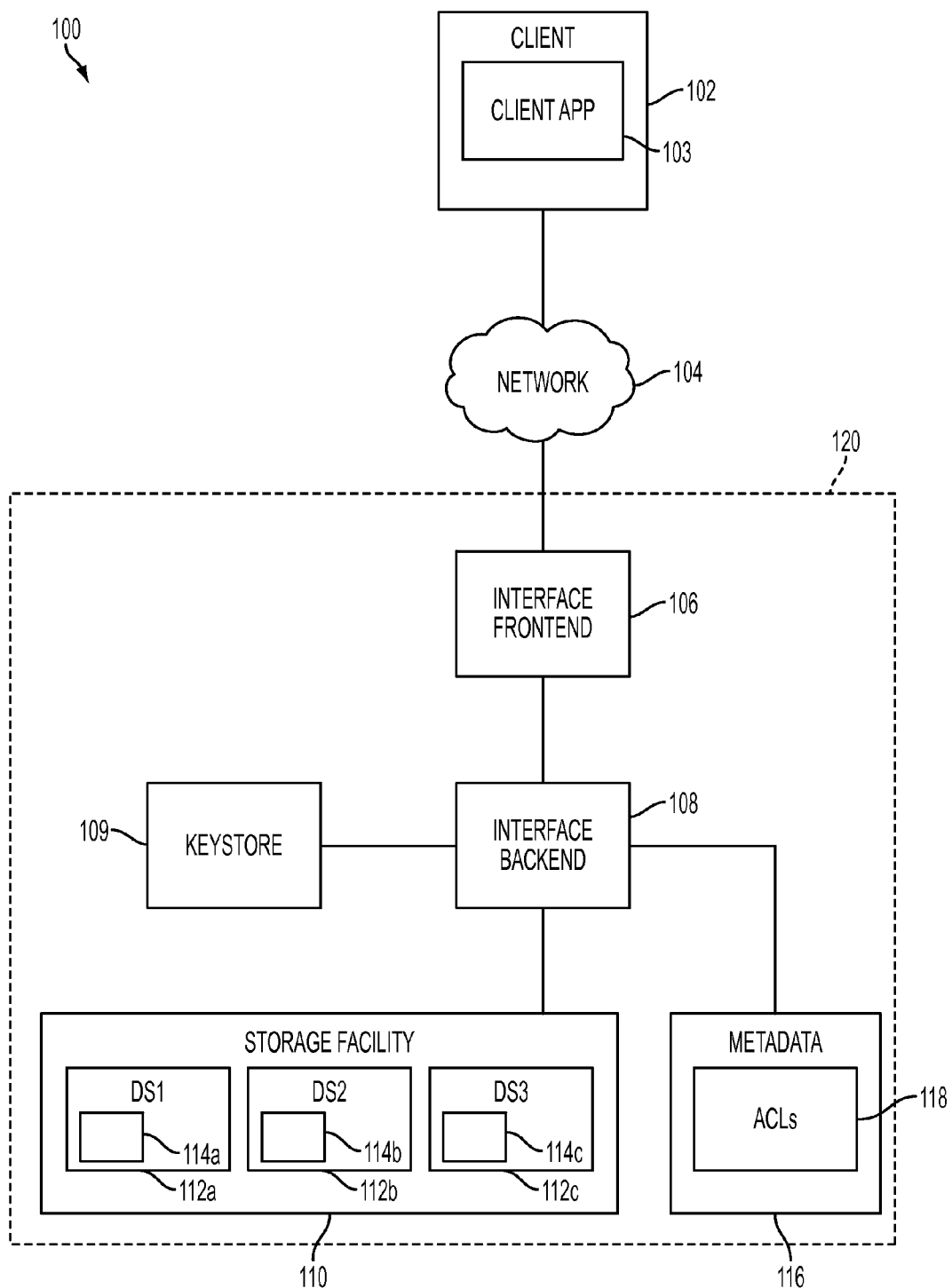
FIG. 1 depicts an example of how a client device may interact with a hosted storage service.

FIG. 1 illustrates a system 100 for transferring information between a client device 102 and a hosted storage service 120 according to an embodiment. In an embodiment, one or more client devices 102 may be connected to one or more communication networks 104. In an embodiment, client device 102 may include a tangible, computer-readable memory on which is stored a client application 103.

The communication network 104 may be connected to a hosted storage service 120. The hosted storage service 120 stores data in one or more storage facilities 110, which are data servers that include a tangible, computer-readable memory to store data. Any of the storage facilities 110 may be scalable by including two or more individual datastores 112a-112c. The datastores may serve as backups to each other, or they may be taken on or offline to create a larger or smaller overall storage facility depending on demand. In some embodiments, one or more of the datastores may be used to store data 114a-114c. Data 114a-114c may be of a particular format. For example, datastore 112a may store data 114a as Binary Large Object (BLOB) data, datastore 112b may store data 114b in a distributed file system (e.g, Network File System), and datastore 112c may store data 114c in a structured data format such as a database. This example is merely illustrative, and datastores 112a-112c may store data in any suitable format.

In various embodiments, the communication network 104 may be a local area network (LAN), a wide area network (WAN), a mobile or cellular communication network, an extranet, an intranet, the Internet and/or the like. In an embodiment, the communication network 104 may provide communication capability between the client device 102, an interface frontend device 106 and/or an interface backend device 108 of the hosted storage service 120. The client device 102 may communicate across the network 104 using any suitable communications protocol, such as Transmission Control Protocol/Internet Protocol (TCP/IP), Hypertext Transfer Protocol (HTTP), Secure Shell Remote Protocol (SSH), Application Program Interfaces (API), or any other suitable protocol. Although FIG. 1 only shows one client device 102, multiple client devices may communicate with the hosted storage service 120 across one or more networks 104.

In an embodiment, the hosted storage service may include an interface frontend device 106 which operates as a management server to receive requests from and send responses to the client device 102. The interface frontend device 106 may include a processor in communication with a computer-readable storage medium. The interface frontend device 106 may be in communication with one or more client devices 102 and/or the interface backend device 108. The interface frontend device 106, although depicted as a single computer system, may be implemented as multiple devices. The interface frontend device 106 may receive messages (e.g., requests) from the client device 102 and parse the request into a format that can be used by the hosted storage service 120, such as a remote procedure call (RPC) to a management server such as the interface frontend device 106. The interface frontend device 106 may prepare responses generated by the hosted storage service 120 for transmission to the client 102.

In some embodiments, the interface frontend device 106 may include programming instructions configured to manage uploads and downloads of large files. This may include functionality such as pausing, resuming, and recovering an upload from time-out. The interface frontend device 106 may monitor load information and update logs, for example to track and protect against denial of service (DOS) attacks.

Some or all of the data resources stored in each storage facility 110 may be stored in encrypted format or unencrypted formal. Data resources that are stored in encrypted format may be associated with one or more encryption keys that are stored in and/or provided by a keystore facility 109, which is a tangible memory that manages the issuance of encryption keys. Any or all of the stored data resources also may be associated with metadata 116 that is stored on a tangible, computer-readable memory. Example types of, and uses for, metadata will be described below.

The interface backend device 108 may include a processor in communication with a computer-readable storage medium. The interface backend device 108 may be in communication with one or more client devices 102 and/or the interface frontend device 106. The interface backend device 108, although depicted as a single computer system, may be implemented as multiple devices. The interface backend device 108 may operate as an authentication server to handle authentication of client requests, manage data resources and metadata, and key retrieval and distribution. In some embodiments, data management may be primarily or fully performed by the interface backend device 108, while external communications may be primarily or fully performed by the interface frontend device 106. Thus, in such embodiments, the interface backend device 108 may isolate the data resources from the client/facing interface frontend device 106 until authentication is performed.

The interface backend device 106 manages metadata 116 associated with the data resources that are in the storage facility 110. For example, a client may request access to a data resource using a data identifier, and the metadata may map the identifier to one or more of the datastores 112a-112c that store the resource. The metadata also may include information such as resource creation times, information about one or more groups or categories to which the resource belongs, resource size, hashes, and access control lists (ACLs) 118 for the resources and groups, or other suitable information. The interface backend device 106 may log activity for each resource, such as information about who accessed each resource and times of access.

The ACLs 118 may identify which users are authorized to perform actions on data resources or groups of data resources, and/or what actions may be performed on each resource or group. As used in this document, a user may be an individual or another identifier such as an invite token or an application identifier. In some embodiments, the ACLs 118 may include an ordered list of ACL entries. Each entry may include a {scope, role} pair and one or more Boolean flags. The scope may identify the users or groups of users who may access the resource or group. In some embodiments, the scope may also represent a token that can be presented to access the resource. Such a token may be distributed to one or more recipients whose userids may be unknown or nonexistent.

The roles—sometimes referred to as privileges—may identify the access permissions for the user or group. Table 1 below (Group Roles) is a list of example roles that can be established in ACLs 118 for data resource groups. Table 2 below (Resource Roles) is a list of example roles that can be established in ACLs 118 for individual data resources. The example roles in tables 1 and 2 are merely illustrative, and ACLs 118 may establish any suitable roles for data resource groups and/or individual data resources.

TABLE 1

Group Roles

| Role | Capabilities |
| --- | --- |
| READER | Can list and access the group's contents. Cannot create, delete or modify resources. |
| WRITER | READ capabilities, plus the ability to create, modify and delete resources in the group. |
| OWNER | WRITE capabilities, plus the ability to read, write and modify the group's ACL. |

TABLE 2

Resource Roles

| Role | Capabilities |
| --- | --- |
| READER | Can access the resource. |
| OWNER | Can read, write, and modify the resource or its ACL. |

Any given ACL 118 may include one or more resource encryption keys for its associated data resource. Each encryption key may have been generated by the keystore 109, by the interface backend device 108, or by another device. In some embodiments, the key may be stored in the keystore 109 and retrieved by the interface backend device 108. Alternatively, the key may be included within the ACL 118 for a resource or group.

Optionally, any given key may be a wrapped key. If so, to obtain the cleartext (unwrapped) key the interface backend device 108 may provide the wrapped key and the client's authentication credentials to the keystore 109. The wrapped key may have associated metadata indicating one or more users or groups of users who are authorized to use the cleartext key. The keystore 109 may determine whether the client's authentication credential is sufficient to authorize release of the unwrapped key, based at least in part on the wrapped key's metadata. If so, the keystore 109 may return the unwrapped key to the interface backend device 108. The interface backend device 108 can then use the key to encrypt or decrypt the data resource. The interface backend device 108 may then discard the key. If a key is a symmetric key, it may be used to both encrypt and decrypt a data resource.

In some embodiments, an ACL 118 may include multiple wrapped keys, each representing the same encryption key with different associated metadata. For example, each ACL entry may be associated with a wrapped key whose metadata corresponds to the entry's scope. Thus, the wrapped keys associated with an ACL entry may correspond to "per-role" or role-specific keys for that entry's role. In some embodiments, the keystore 109 may copy a wrapped key and re-wrap the key for a different user or group of users (i.e., using different metadata).

The determination of whether a user is authorized to unwrap a wrapped key may be based on an authentication credential of the user. For example, the metadata associated with the wrapped key may include a hash of the user's password. When the user presents a password, the hosted service may determine whether a hash of the presented password matches the hash that is included in the metadata. Alternatively, the user's authentication credential may include a token that the interface backend device 108 presents to the keystore 109. The keystore 109 may use the token to verify the user authentication credentials and, upon verification, return the unwrapped key.

Figure 2:
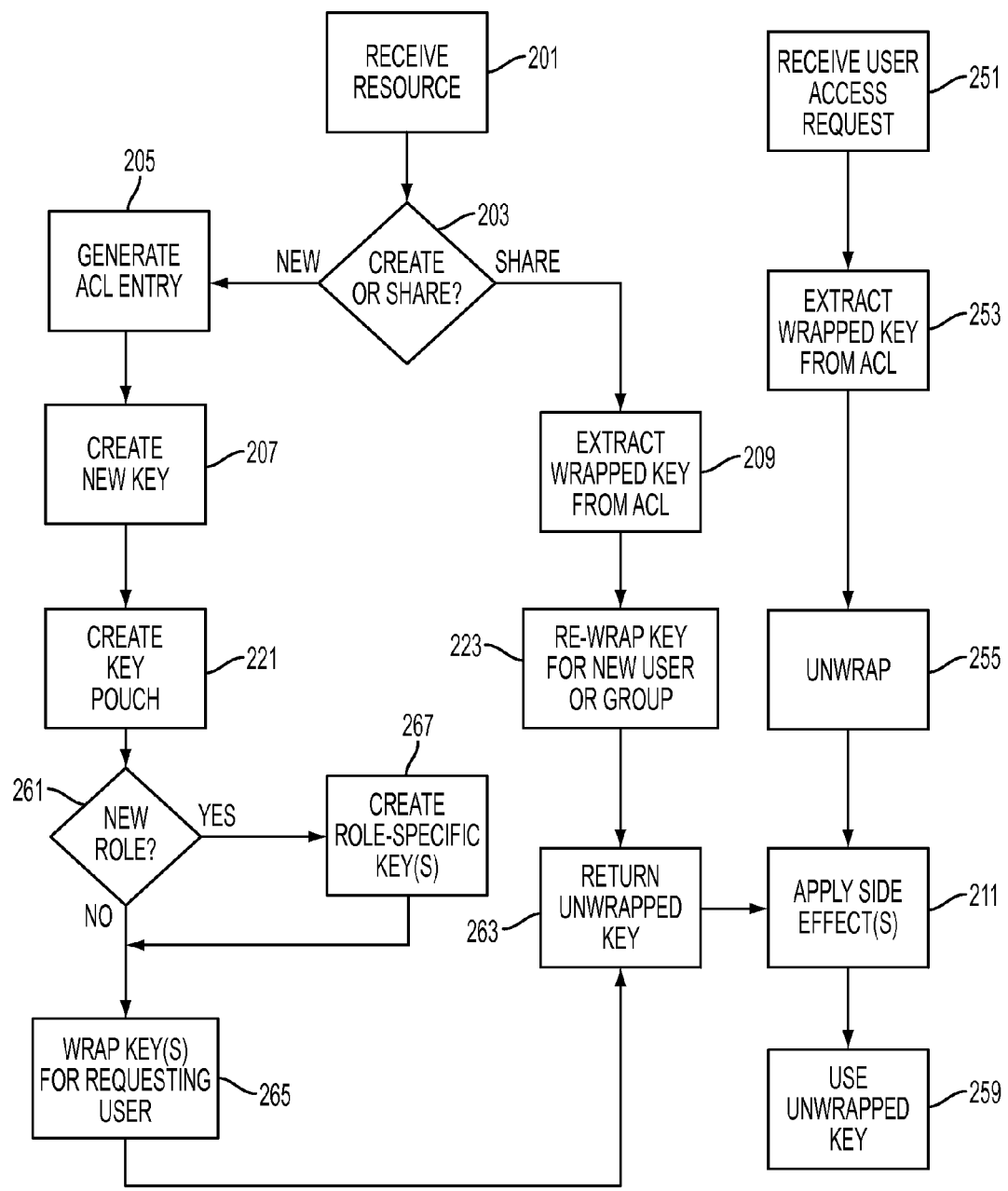
FIG. 2 is a flowchart that shows how a client device may interact with a hosted storage service to retrieve encrypted data.

In some embodiments, the interface backend device 108 may include programming instructions that implement an ACL service module that supports the interpretation and manipulation of the ACL, including helping manage the use of wrapped keys that are stored in the ACL for a resource. FIG. 2 is a flowchart that shows how a client device may interact with the hosted storage service to retrieve encrypted data. When the interface backend device receives a request to create or share a resource 201, the interface backend device may determine whether the resource is a new resource or an existing resource 203. If the resource is a new resource, the interface backend device may issue a request to the ACL service 205 to create an ACL, and the ACL service may automatically generate a new key or request one from the keystore 207. The ACL service may make a request to the keystore to wrap a new key 265 for the requesting user, and it may create an ACL entry with the new wrapped key. The ACL service may create a key pouch 221 for the requesting user and place the new key into the key pouch. The key pouch is a unit of storage, such as a file or memory sector, that includes a set of keys for a resource that are held on behalf of a given end user or group of users. The key pouch serves as a cache of unwrapped encryption keys and wrapped encryption keys obtained from the keystore, and it may help to reduce the number of requests to the keystore.

If the resource is an existing resource to be shared, the interface backend device may issue a sharing request to the ACL service, including the requesting user's credentials. The ACL service will find an ACL entry corresponding to the user and the requested access role and extract the wrapped key 209 from that entry. The ACL service will make a request to the keystore to copy and re-wrap 223 the wrapped key for the new user or group to be granted access, using the requesting user's credentials, and create a new ACL entry with the new wrapped key. The ACL service may return the unwrapped key 263 to the interface backend device, which may use it 259 to encrypt or decrypt the resource.

In some embodiments, when a user uploads a data resource to, or creates a data resource on, the hosted storage service, the user may identify one or more roles (e.g, READER, WRITER, OWNER) for the data resource 261. If so, the ACL service or another part of the hosted storage service may generate one or more role-specific keys for the resource 263. The role-specific key for one role (e.g., READER) may be different from the role-specific key for another role (e.g., WRITER), and require different credentials. Thus, when a user submits a use request (such as to read or write to a data resource), the system may determine whether the use request matches a role, and if so it will retrieve the role-specific key. In addition, a role-specific key may cover a unique group of roles for the resource. The wrapped, role-specific key may be associated with the ACL entry for that user or the user's group. In this way, only users who present the required credential for the role-specific key will be granted the role and permitted to perform the role-specific action on the resource.

In some embodiments, a first authorized user may permit a data resource to be shared with a second user 203. If so, the first user or the hosted storage service may identify one or more roles (such as read) that the second user is authorized to perform on the resource. The system may determine whether the first user is authorized to share the data resource, and if so, the service will then extract and unwrap 209 the key and then re-wrap the key 223, optionally a role-specific key, for the second user. The re-wrapped and/or role-specific key also may be stored in the key pouch for the first user. When the second user then presents an access request for the data resource, the system will compare the second user's authorization credentials against those for the re-wrapped key. If the authorization credential is verified, the re-wrapped key may be unwrapped, and the second user may be authorized to perform the permitted action on the data resource.

In the process of interpreting or manipulating an ACL, the ACL service may make certain changes to the ACL as a side effect 211. For example, it may replace an ACL entry whose scope is an e-mail address with an entry whose scope is a unique user id associated with that e-mail address. A second example is that an ACL entry representing an invitation to access the resource may be replaced or supplemented with an ACL entry for a specific user who has presented the corresponding invitation token. When making such side effect modifications, the ACL service may obtain re-wrapped keys from the keystore for the new or modified entries.

After an ACL is created, the interface backend device may obtain unwrapped keys on behalf of an authorized user from the ACL service without directly interacting with the keystore. When the interface backend device receives an access request from a user 251, the access request will include an authentication credential such as a cookie, an invite token, a data access token, a password, or another credential. Optionally, any given user or group of users may be associated with one or more credentials. The ACL service will identify the user authentication credential and obtain the resource's wrapped key from the ACL 253. The ACL service will then automatically, without any further input from the user, initiate an unwrap request to the keystore 255, using the credentials received from the interface backend device. The ACL service may then receive the unwrapped key from the keystore and use 259 the unwrapped key by presenting the key to the user and/or using it to access or decrypt a resource that is presented to the interface backend device.

Examples of operations that an interface backend device may perform with the support of the ACL service and keystore include:

User A Creates New Document D, Grants Herself Access:

A software application within the hosted service enables the service to create a key pouch for D for A and indicates what kind of key is used for this kind of document. The application then generates a new key in the key pouch. The application, optionally using the ACL service, also creates an empty ACL for D and an ACL entry for User A as owner. A key wrapped for User A is automatically inserted in the new entry. The application receives a raw key to encrypt D.

User A Shares Document D with User B:

The key pouch now has the key for D wrapped for User A, extracted from the relevant ACL entry. The application confirms User A's authorization to share and creates an ACL entry for User B as reader. A key for D, wrapped for User B, is automatically inserted in the new entry.

User B Accesses Existing Document D:

This is a simple "authorization check" case involving no ACL modifications. The interface backend device presents credentials for User B to the ACL service and requests that the ACL service check that User B is authorized for a given role (e.g., READER) in the ACL for D. The ACL service finds an ACL entry for User B or for some group to which User B belongs, extracts the wrapped key from that entry, and sends the wrapped key to the keystore with credentials for User B, requesting the unwrapped key. This unwrapped key is returned to the interface backend device along with an indication that User B is authorized to access document D. Alternatively, the request to the ACL service may not specify the desired role, and the response from the ACL service may indicate what role(s) User B is authorized for.

User A Invites User B to Read Document D:

The application creates an ACL entry for the invite. The new ACL entry will contain the rewrapped key, wrapped for the returned invite token.

Invite is Used by User B:

The application confirms User B's invite. The interface backend device presents the invite token from User B to the ACL service, and requests that the ACL service add an entry for User B to the existing ACL for document D. The ACL service extracts a key wrapped for the invite token from an existing entry in the ACL and presents that wrapped key to the keystore with the invite token, requesting the unwrapped key to be returned to the interface backend device. Optionally, the ACL service may also request a new wrapped key for User B, to include in a new entry for User B added to the ACL. It may optionally remove the entry for the invite token from the ACL as well.

Figure 3:
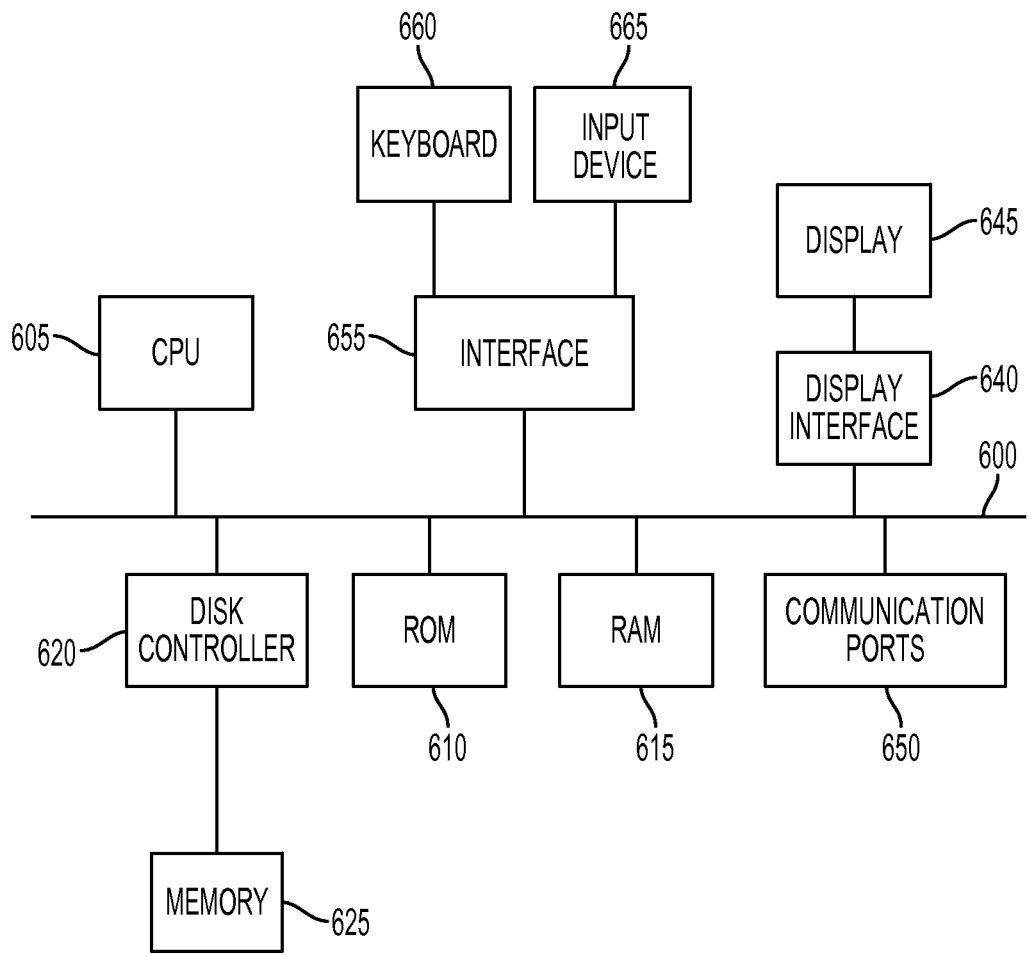
FIG. 3 is a block diagram of hardware that may be used to contain or implement program instructions according to an embodiment.

FIG. 3 is a block diagram of exemplary hardware that may be used to contain or implement program instructions according to an embodiment. A bus 600 serves as the main information pathway interconnecting the other illustrated components of the hardware. CPU 605 is the central processing unit of the system, performing calculations and logic operations required to execute a program. Read only memory (ROM) 610 and random access memory (RAM) 615 constitute exemplary memory devices.

A controller 620 interfaces with one or more optional memory devices 625 to the system bus 600. These memory devices 625 may include, for example, an external or internal DVD drive, a CD ROM drive, a hard drive, flash memory, a USB drive or the like. As indicated previously, these various drives and controllers are optional devices.

Program instructions may be stored in the ROM 610 and/or the RAM 615. Optionally, program instructions may be stored on a tangible computer readable storage medium such as a hard disk, compact disk, a digital disk, flash memory, a memory card, a USB drive, an optical disc storage medium, such as Blu-Ray™ disc, and/or other recording medium.

An optional display interface 640 may permit information from the bus 600 to be displayed on the display 645 in audio, visual, graphic or alphanumeric format. Communication with external devices may occur using various communication ports 650. A communication port 650 may be attached to a communications network, such as the Internet or an intranet.

The hardware may also include an interface 655 which allows for receipt of data from input devices such as a keyboard 660 or other input device 665 such as a mouse, a joystick, a touch screen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method, comprising:
 receiving, by a management server of a hosted storage service, a data resource and a resource authentication credential;
 assigning, by the hosted storage service, an encryption key to the data resource;
 encrypting the data resource to form an encrypted data resource;
 storing the encrypted data resource in a storage facility of the hosted storage service;
 producing, based on the assigned encryption key, a wrapped encryption key;
 storing the wrapped encryption key in an access control list (ACL) in association with the encrypted data resource;
 receiving, from a first user, a request to access the data resource, wherein the request includes a presented authentication credential and a request to share the data resource with a second user;
 in response to receiving the request, automatically and without additional input from the user, verifying that the presented authentication credential demonstrates authorization to unwrap the wrapped encryption key, and unwrapping the wrapped encryption key;
 using the unwrapped encryption key to decrypt the encrypted data resource;
 providing the first user with access to the data resource;
 determining that the first user is authorized to share the data resource; and
 re-wrapping the unwrapped encryption key for the second user.

2. The method of claim 1, wherein:
 assigning the encryption key to the data resource comprises, by an ACL service of the hosted storage service, creating a key pouch for the data resource; and
 storing the wrapped encryption key in the ACL comprises storing the wrapped encryption key in the key pouch.

3. The method of claim 2, wherein the method also includes storing the re-wrapped encryption key in the key pouch.

4. The method of claim 2, wherein:
 producing a wrapped encryption key comprises:
  identifying a role for the data resource; and
  generating a wrapped role-specific encryption key; and
 storing the wrapped encryption key in the ACL comprises storing the role-specific encryption key in the key pouch.

5. The method of claim 4, wherein the role-specific encryption key comprises metadata that represents the scope of an access privilege for an authorized user of the role-specific encryption key.

6. The method of claim 5, wherein:
 receiving the request to access the data resource comprises receiving a use request;
 the method also comprises determining whether the use request matches a role for the data resource; and
 retrieving the wrapped encryption key comprises retrieving the wrapped role-specific encryption key having a role that matches the use request.

7. The method of claim 6, wherein the role comprises an access privilege for an authorized user of the wrapped role-specific encryption key.

8. The method of claim 1, wherein assigning the wrapped encryption key to the data resource comprises:
 identifying one or more users or groups who are authorized to use a cleartext key;
 including the one or more users or groups in metadata; and
 using the metadata to create the wrapped encryption key.

9. The method of claim 8, wherein assigning the wrapped encryption key to the data resource comprises:
 identifying one or more roles for the cleartext key; and
 including the one or more roles in the metadata.

10. A method, comprising:
 receiving, by a management server of a hosted storage service, a data resource;
 assigning, by the hosted storage service, an encryption key to the data resource;
 creating, by the hosted storage service, a wrapped encryption key comprising the assigned encryption key and authorized user metadata;
 encrypting the data resource to form an encrypted data resource;
 storing the encrypted data resource in a storage facility of the hosted storage service;
 storing the wrapped encryption key in an access control list (ACL) in association with the encrypted data resource;
 receiving, from a first user, a request to access the data resource, wherein the request includes a presented authentication credential and a request to share the data resource with a second user;
 in response to receiving the request, automatically and without additional input from the user, verifying that the presented authentication credential demonstrates authorization to unwrap the wrapped encryption key, and unwrapping the wrapped encryption key;
 using the unwrapped encryption key to decrypt the encrypted data resource;
 providing the first user with access to the data resource;
 determining that the first user is authorized to share the data resource; and re-wrapping the unwrapped encryption key for the second user.

11. The method of claim 10, wherein creating the wrapped encryption key comprises:
identifying one or more users or groups who are authorized to use a cleartext key;
including the one or more users or groups in metadata; and
using the metadata to create the wrapped encryption key.

12. The method of claim 11, wherein creating the wrapped encryption key comprises:
identifying one or more roles for the cleartext key; and
including the one or more roles in the metadata.

13. A data management system, comprising:
a hosted storage service comprising an authentication server, one or more datastores, an access control list (ACL) memory, and a memory containing programming instructions that enable a processor to:
receive a data resource and a resource authentication credential;
assign an encryption key to the data resource;
encrypt the data resource to form an encrypted data resource;
store the encrypted data resource in the datastore;
create an ACL entry in the ACL memory;
generate a wrapped encryption key;
store the wrapped encryption key in the ACL entry in association with the encrypted data resource;
receive, from a first user, a request to access the data resource, wherein the request includes a presented authentication credential and a request to share the data resource with a second user;
verify that the presented authentication credential demonstrates authorization to unwrap the wrapped encryption key, and unwrap the wrapped encryption key;
use the unwrapped encryption key to decrypt the encrypted data resource;
present the data resource to the first user;
determine that the first user is authorized to share the data resource; and
re-wrap the unwrapped encryption key for the second user.

14. The system of claim 13, wherein:
the instructions that enable the processor to assign the encryption key to the data resource further enable the processor to:
cause an ACL service to create a key pouch for the data resource, and
generate a new encryption key; and
the instructions that enable the processor to store the wrapped encryption key in the ACL entry comprise instructions that enable the processor to store the wrapped encryption key in the key pouch.

15. The system of claim 14, wherein the instructions also comprise instructions that enable the processor to store the re-wrapped encryption key in the key pouch.

16. The system of claim 14, wherein:
the instructions that enable the processor to assign the wrapped encryption key to the data resource comprise instructions that further enable the processor to:
identify a role for the data resource, and
generate a wrapped role-specific encryption key; and
the instructions that enable the processor to store the wrapped encryption key in the ACL entry comprise instructions for storing the wrapped role-specific encryption key in the key pouch.

17. The system of claim 16, wherein the wrapped role-specific encryption key comprises metadata that represents the scope of an access privilege for an authorized user of the wrapped role-specific encryption key.

18. The system of claim 16, wherein:
the request to access the data resource comprises receiving a use request; and
the instructions also comprise instructions that enable the processor to determine whether the use request matches a role for the data resource; and
the instructions that enable the processor to retrieve the wrapped encryption key comprise instructions that further enable the processor to retrieve the wrapped role-specific encryption key having a role that matches the use request.

19. The system of claim 18, wherein the role comprises an access privilege for an authorized user of the wrapped role-specific encryption key.

20. The system of claim 13, wherein the instructions that enable the processor to assign the wrapped encryption key to the data resource comprise instructions to:
identify one or more users or groups who are authorized to use a cleartext key;
include the one or more users or groups in metadata; and
use the metadata to create the wrapped encryption key.

21. The system of claim 20, wherein the instructions that enable the processor to assign the wrapped encryption key to the data resource comprise instructions to:
identify one or more roles for the cleartext key; and
include the one or more roles in the metadata.

* * * * *